United States Patent [19]

Leining

[11] 4,186,461
[45] Feb. 5, 1980

[54] HAND SUPPORTED SKINNING DEVICE

[75] Inventor: Lyndon R. Leining, Austin, Minn.

[73] Assignee: Geo. A. Hormel & Company, Austin, Minn.

[21] Appl. No.: 897,140

[22] Filed: Apr. 17, 1978

[51] Int. Cl.² ............................................. A22B 5/16
[52] U.S. Cl. .......................................... 17/21; 99/591
[58] Field of Search ................. 17/21, 62, 50, 18, 19; 99/584, 588, 589, 591

[56] References Cited

U.S. PATENT DOCUMENTS 1,988,098  1/1935  Weibel ................................. 99/591
4,071,923  2/1978  Smith ..................................... 17/21

Primary Examiner—Willie G. Abercrombie
Attorney, Agent, or Firm—Williamson, Bains, Moore & Hansen

[57] ABSTRACT

A hand supported skinning device for removing the skin from animal carcasses includes a housing having a handle attached thereto. A stationary blade is mounted on the housing closely adjacent a driven revolvable feeder roll which grips and pulls the animal skin against the blade to permit the skin to be progressively moved from the carcass.

7 Claims, 8 Drawing Figures

HAND SUPPORTED SKINNING DEVICE

SUMMARY OF THE INVENTION

This invention relates to a skinning device and more particularly to a hand supported skinning device for removing skins from animal carcasses such as hogs and the like.

In some operational systems in the meat packing industry the skin is removed from an animal carcass in a pulling operation. In other operational systems the carcass after evisceration is first cut into separate primal cuts and the skin is thereafter removed from the primal cuts by stationary skinning devices which utilize a cutting action. Devices which utilize a pulling action to remove the skin also remove fat from the carcasses even though it is desirable to have the fat remain on the skinned carcasses. It is also desirable to remove the skin from carcasses in many instances prior to butchering the carcasses into primal cuts.

It is therefore an object of this invention to provide a hand type skinning knife, of simple and inexpensive construction, which may be used to efficiently remove the skin from an animal carcass, such as hogs and the like.

A more specific object of this invention is to provide a hand type skinning knife having a stationary blade and driven toothed roll which cooperate with each other to cut and remove strips of skin from the animal carcass.

FIGURES OF THE DRAWINGS

FIG. 4 is a cross sectional view taken approximately along line 4—4 of FIG. 3 and looking in the direction of the arrows;

DESCRIPTION OF THE PREFERRED EMBODIMENT

Figure 1:
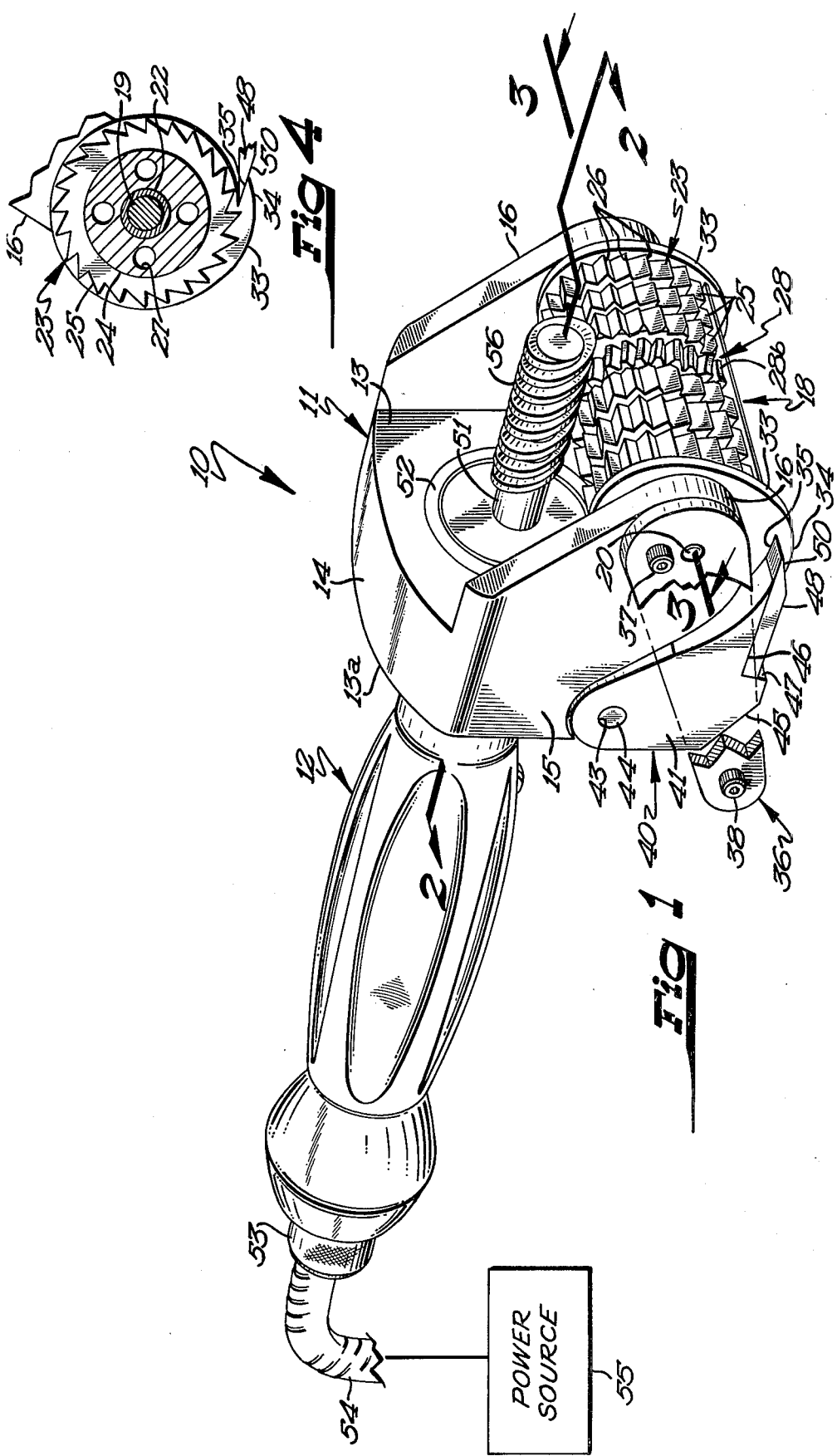
FIG. 1 is a front perspective view of one embodiment of the novel skinning device.

Referring now to the drawings and more particularly to FIGS. 1 through 4, it will be seen that one embodiment of the novel hand held skinning device or knife designated generally by the reference numeral 10 is thereshown. The skinning device 10 includes a housing 11 to which is secured an elongated hollow handle 12. The housing in handle 12 is preferably formed of stainless steel or aluminum and the housing includes a front wall 13, a top wall 14, opposed side walls 15, and a rear wall 13a. The side walls 15 have projections 16 which extend forwardly therefrom, each having an opening 17 in its forward end. A roll assembly 18 is mounted on the side wall projection 16 and extends therebetween. The roll assembly 18 includes an elongated shaft 19 of circular cross sectional configuration and having the reduced end 20. The reduced end portions of the shaft 20 project through the openings 17 and side wall projections 16. A pair of cylindrical axially spaced apart bearing elements 21 are positioned upon the shaft 19 and a pair of aluminum sleeve bearings 22 are disposed in concentric relation with respect to the bearing elements 21. It will be noted that the sleeve bearings 22 have an axial dimension corresponding to the axial dimension of the bearing elements 21.

The roll assembly 18 also includes a pair of similar axiallly spaced apart revolvable gripping members each positioned upon one of the sleeve bearings 22 and each including a hub 24. Each gripping member 23 also includes a pair of axially spaced apart tooth wheels 25 having circumferentially arranged teeth 26 projecting outwardly therefrom. It will be noted that the teeth 26 on each tooth wheel extend angularly in a rearward direction. Adjacent tooth wheels for each revolvable gripping member 23 are interconnected by a connecting portion 25a, threee such tooth wheels being provided for each revolvable gripping member in the embodiment disclosed in FIGS. 1 through 4.

Figure 3:
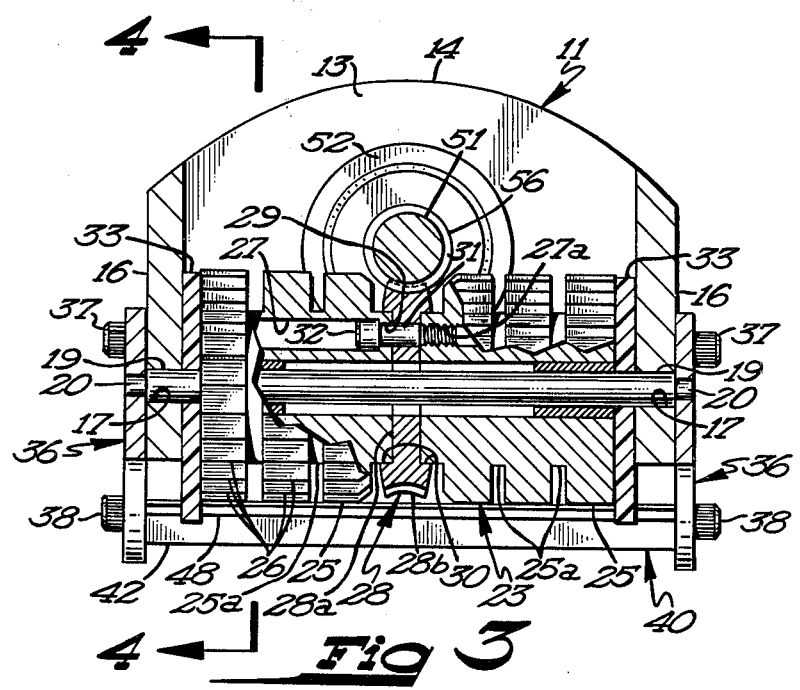
FIG. 3 is a cross sectional view taken approximately along line 3—3 of FIG. 1 and looking in the directions of the arrows.

The hub of one of the revolvable gripping members 23 is provided with an axially extending aperture 27 therethrough. The other gripping member is provided with a threaded aperture 27a therethrough as best seen in FIG. 3. A worm gear 28 having an axial opening therethrough is positioned upon the shaft 19 and is disposed between an engaging relation with the gripping members 23. The worm gear 28 includes a hub 28a and a circumferential tooth portion 28b, the latter having a greater axial dimension than the axial dimension of the hub as best seen in FIG. 3 to thereby define annular shoulders 30 which engage the hubs of the gripping members 23. A bolt 31 extends through the non-threaded opening in one of the gripping members and through opening in the worm gear and threadedly engages in the threaded opening 27a in the other gripping member. With this arrangement, the worm gear is clamped between the gripping members whereby the worm gear and the gripping members will revolve as a unit relative to the shaft 19.

The roll assembly 18 also includes a pair of skin edgers 33 preferably formed of a non-metallic material such as plastic and each having an opening therethrough through which the shaft 19 projects. It will be noted that the skin edgers are positioned between the outermost tooth wheels of each gripping member and the associated side wall projections 16. Each skin edger also has a rearwardly extending tooth-like projection integrally formed therewith, which defines a rearwardly facing recess 35 as best seen in FIG. 4.

A pair of similar elongated generaly tapered arms 36 each having an opening in one end thereof are positioned upon the reduced end portions of the shaft 19 and project rearwardly therefrom. Each of the arms 36 also has another opening therethrough adjacent the opening for accommodating the shaft 19 through which projects a threaded bolt 37 which threadedly engages in the adjacent side wall projection 16. The rear end portion of each arm 36 has an opening therethrough which accommodates the shank of a threaded bolt 38, the latter projecting into threaded recesses formed in the ends of an elongated substantially straight rigid pressure bar 39.

The pressure bar 39 is therefore retained in place by the arms 36 and engages an elongate resilient tubular element 39 which engages the rear end portions of the generally U-shaped blade holder 40. The blade holder 40 includes a pair of end members 41 which are integral with a transverse member 42. It will be noted that the end members 41 are each provided with an opening 43 therethrough which projects a shaft 44, the ends of shaft 44 project through openings in the side walls 14 to pivotally mount the blade holder on the housing 11.

It will be noted that each of the end members of the blade holder 40 has an inclined rear edge portion 45 which is engaged by the resilient tube 39a to urge the blade holder in a forward direction. It will also be noted that the lower surface of the transverse member and the lower forward surface of the end members are recessed to define a blade receiving recess 46 therein having a shoulder 47 for accommodating a blade 48. The blade 48 which is of elongated generally rectangular shaped configuration has a plurality of openings therethrough which are disposed in registering relation with corresponding openings in the transverse member of the blade holder 40. The openings in the blade holder 40 are threaded and accommodate bolts 49 therein which secure the blade to the blade holder. The cutting edge 50 of the blade 48 engages in the recess 35 of each of the skin edgers 33 to support the forward end of the blade in close proximity to the roll assembly 18. The roll assembly 18 will be revolved in a clockwise direction as viewed in FIG. 2 and will serve to grip the skin of a hog and exert a pulling action on the skin. The cutting edge 50 of the blade 48 will engage the connective tissue connecting the skin to the carcass and will permit progressive skinning of the hog carcass. Referring again to FIG. 2, it will be noted that shaft 44 is positioned in a recess 12a in the handle 12 and a recess 14b in the lower wall 14a of the housing 11. This arrangement locks the handle 12 to the housing 11.

Figure 2:
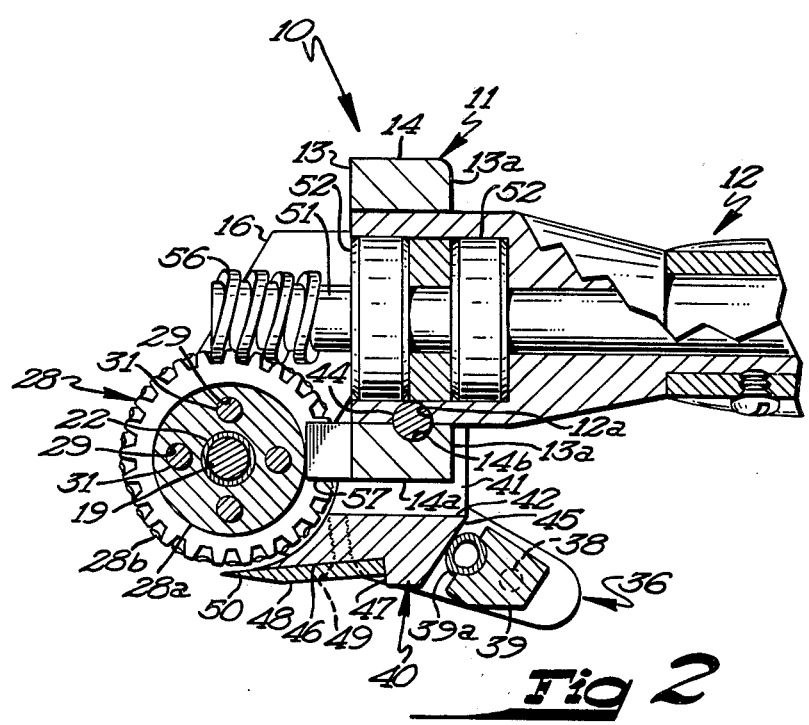
FIG. 2 is a cross sectional view taken approximately along line 2—2 of FIG. 1 and looking in the directions of the arrows.

Means are provided for driving the roll assembly and this means includes an elongated drive shaft 51 which is journaled in bearings 52 positioned within the housing 11 as best seen in FIG. 2. The shaft 51 projects through the knife handle 12 and is connected by coupling 53 to an elongated flexible shaft 54 which in turn is connected to a source of power for imparting rotary motion to the flexible shaft. In this respect, the flexible shaft 54 may be connected to a suitable electric motor, hydraulic motor, or pneumatic motor, which imparts rotary motion to the shaft. The forward end of the drive shaft 51 is provided with a worm 56 which meshes with a worm gear 28 to drive the latter in a conterclockwise direction as seen in FIG. 3.

A plurality of elongated similar laterally spaced apart stripper fingers 57 are integral with the lower wall 14a of the housing and project forwardly therefrom. It will be noted that the forward end portions of the stripper fingers 57 extend between adjacent tooth wheels 25 and each finger engages the connecting portion 25a of each revolvable member. The stripper fingers serve to prevent skin or flesh from being wound upon the gripping members 23 during operation of the skinning device.

In operation, an animal carcass, preferably a hog carcass, will be typically suspended by its hind legs from an overhead rail by a mandrel. It is pointed out, however, that the hog carcass may be supported on a table or may be positioned on any other support during the skinning operation. The skin will have been removed from the hind quarters and from the fore quarters but the torso will remain unskinned. The motor 55 will be energized thereby driving the shaft 54 which revolves the worm 56. The worm will be driven in a direction to drive the roll assembly 18 in a counterclockwise direction as viewed in FIG. 2. The teeth 26 on the tooth wheels 25 will engage the upper surface of the skin to progressively pull the skin against the cutting edge 50 of the blade 48. Thus, by moving the skinning knife 10 in an upward direction, the skin can be removed from the carcass in strips, these strips corresponding to the width of the roll assembly 18 and the length of the blade 48. Thus, the skin from the hog carcass may be very effectively removed with the skinning knife 10. It is further pointed out that the hand skinner can be used to removed skin or skin patches from any part of the hog.

Figure 5:
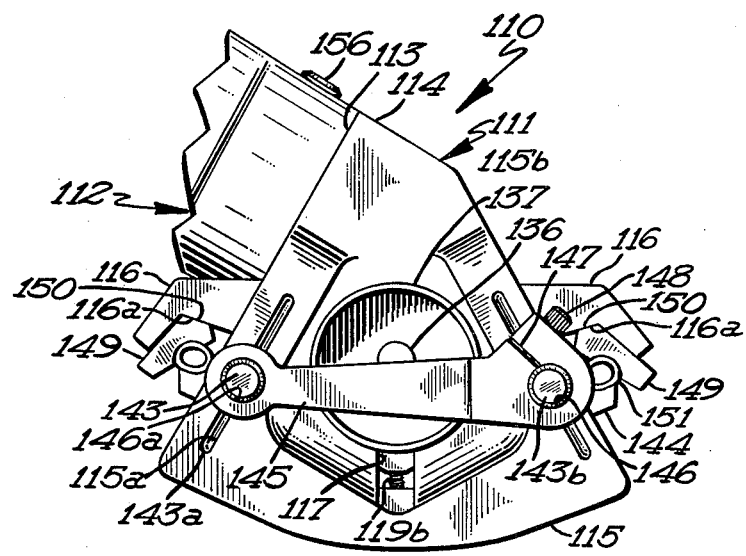
FIG. 5 is a side elevational view of a different embodiment of the skinning device.

Referring now to FIGS. 5 to 8, it will be seen that a modified form of the hand skinning knife designated generally by the reference numeral 110, is thereshown. The knife includes a housing 111 having a handle 112 secured thereto and projecting therefrom, as best seen in FIG. 5. The housing 111 includes a rear transverse wall 113, a relatively small top wall 114 and opposed side walls 115. It will be noted that the side walls 115 are of generally triangular shaped configuration. Each side wall 115 has a pair of projections 116 extending outwardly therefrom, and each side wall has an opening 117 therein.

A roll assembly 118 is journaled on an elongated shaft 119 having ends which project through the openings 117 and the side walls 115. The roll assembly 118 includes a pair of axially spaced apart bearing elements 121 positioned upon the shaft 119 and each bearing element 121 is also positioned concentrically within one of a pair of axially spaced apart sleeve bearings 122. A pair of revolvable gripping members 123 are each positioned upon one of the sleeve bearings 122 and each includes a hub 124 having a pair of axially spaced apart tooth wheels 125 integrally formed therewith. It will be noted that the tooth wheels of each revolvable gripping member 123 are interconnected by connecting portions 125a and it will further be noted that the teeth 126 on each tooth wheel projects radially outwardly therefrom.

Figure 8:
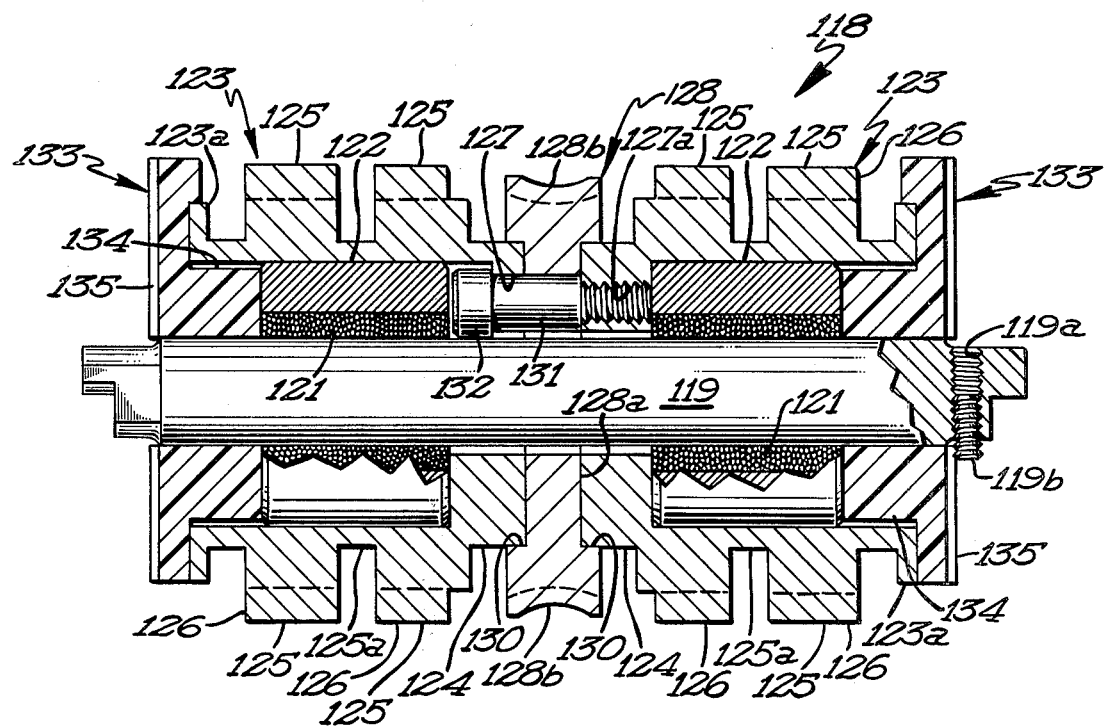
FIG. 8 is a cross-sectional view taken along line 8—8 of FIG. 7 and looking in the direction of the arrows.

The hub 124 of one revolvable gripping member has an axial opening 127 therein and the hub of the other revolvable gripping member has a threaded axial opening 127a therein. A worm gear 128 having a hub 128a and a circumferential tooth portion 128b is positioned between the revolvable gripping member as best seen in FIG. 8. It will be noted that the circumferential tooth portion 128b has a larger axial dimension than the axial dimension of the hub 128a of the worm gear to thereby define annular shoulders 130 which engage the outer circumferential surface of the hubs 124 of the revolvable gripping members 123. The worm gear 128 is provided with an axial opening 129 therein through which projects a bolt 131 having a head 132. The bolt projects through the axial opening 127, the axial opening 129 and threadedly engaging the threaded opening 127a to clampingly secure the worm gear to the revolvable gripping members.

Figure 6:
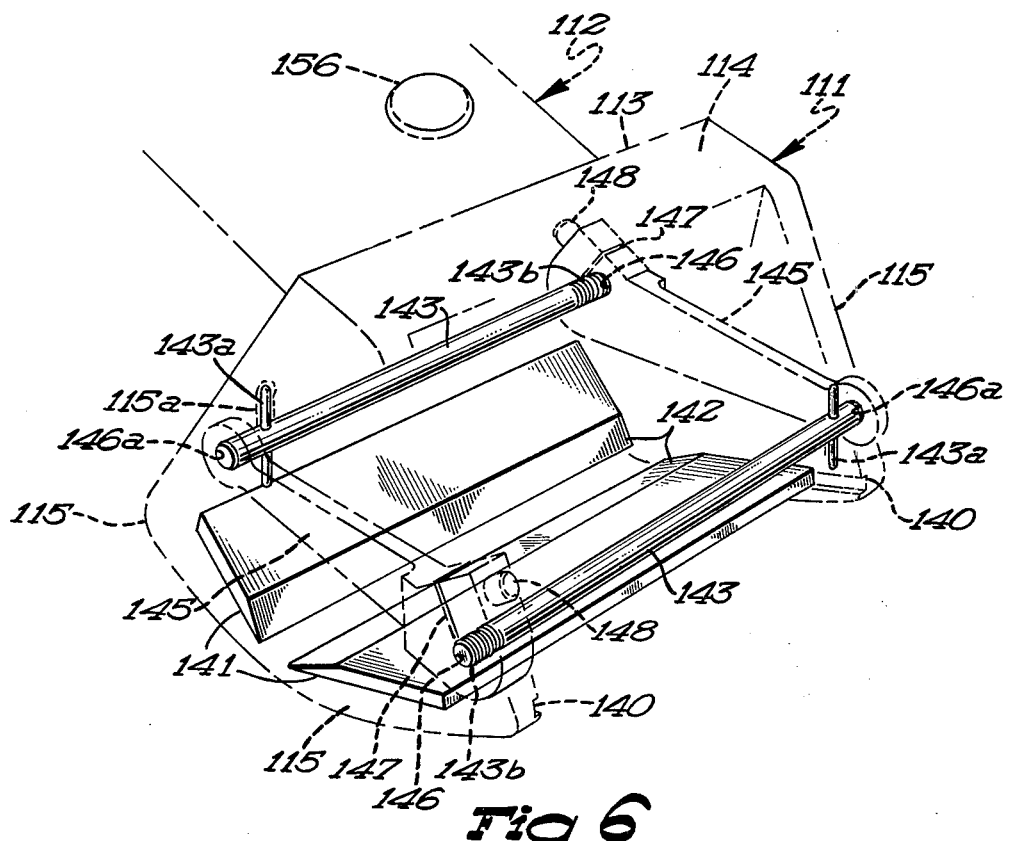
FIG. 6 is a perspective view of the blades and certain other components of the embodiment of FIG. 5.
Figure 7:
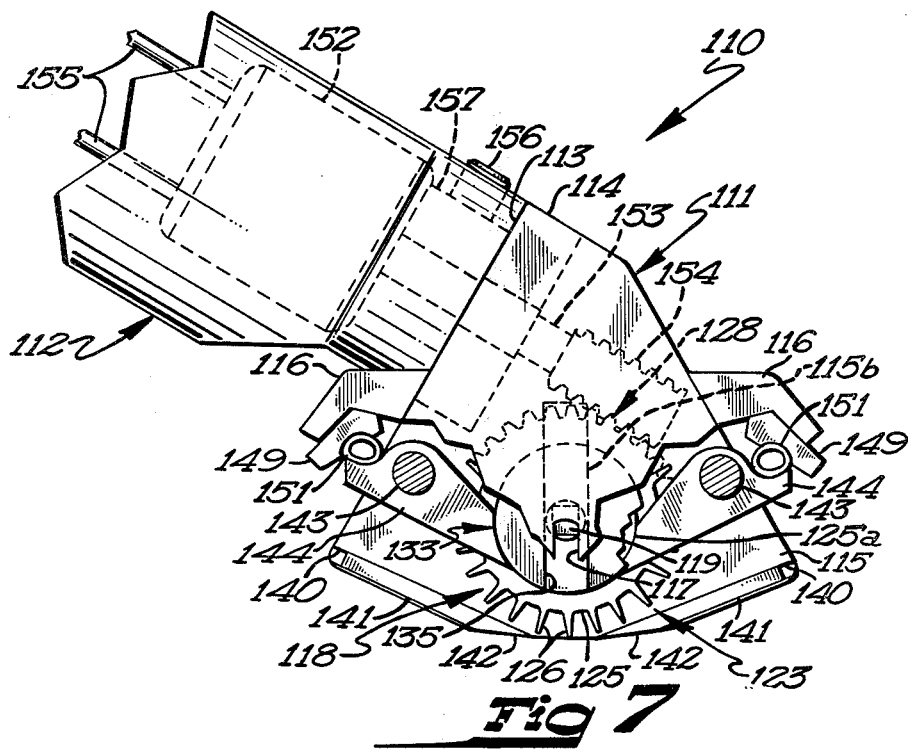
FIG. 7 is a side elevational view similar to FIG. 5 but with certain parts broken away for clarity.

Each revolvable gripping member 123 is provided with an outturned radially extending lip 123a at its outer end as best seen in FIG. 6. A pair of skin edgers 133 having a hub 134 are positioned upon the shaft 119. Each hub 134 engages the adjacent bearing element 121 and sleeve bearing 122. Each of the skin edgers 133 is provided with a diametrical slot 135 therethrough, which engages a key element 115b formed on the inner surfaces of each of the side walls 115. With this arrangement, the skin edgers 133 are locked against rotation with respect to the revolvable gripping members 123.

It will also be noted that the end portions of the shaft 119 have diametrically extending threaded bores 119a therein, each of which accommodates a bolt 119b. A pair of circular knobs 136, each having a concentric opening 137 through the center thereof, are positioned upon the outer ends of the shaft 119. Each circular knob 136 has an eccentric rim projecting axially inwardly from an inner surface thereof. Each side wall 115 is provided with a circular boss which projects outwardly therefrom, the boss encircling the opening 117 in the associated side wall through which the ends of the shaft 119 project. When the circular knobs are positioned upon the ends of the shaft 119 and thereafter rotated, the eccentric rim will tighten against the circular boss.

The side walls 115 are each provided with a pair of elongated slots in the inner surface thereof which extend in angulated relation downwardly and inwardly towards each other. One slot 140 in one side wall 114 is positioned in opposed parallel relation with respect to a slot 140 in the other side wall to thereby accommodate the edge portions of a pair of generally rectangular blades 141. Each blade 141 has a tapered cutting edge 142 which extends below and in close proximity to the teeth 126 of the revolvable gripping members 123.

It will be noted that the cutting edges of the blades 142 are disposed in almost tangential relation with the teeth of the revolvable gripping members 123 as best seen in FIG. 5.

A pair of spaced apart pivot shafts 143 each extend between and project through openings in the side walls 115 as best seen in FIG. 5. Each of the pivot shafts 143 have a plurality of transversely spaced apart stripper fingers 144 pivotally mounted thereon, the stripper fingers projecting towards the roll assembly 118 and each stripper finger is positioned between adjacent tooth wheels 125 to engage the connecting portion 125a of the gripping members 123. The ends of the shafts 143 which project outwardly beyond the outer surface of the side walls 115 are each provided with a pin 143a which extends diametrically therethrough and which projects radially outwardly therefrom and engages in a slot 115a formed in the side wall 115. The interaction between the pin 143a and the slot 115a prevents rotation of the shafts 143 relative to the side walls 115.

A pair of elongated arms 145 are provided and each has a threaded opening 146 at one end thereof and an unthreaded opening 146a at the other end thereof. The shafts 143 project through the openings 146 in the arms, and it will be noted that one end portion of each arm 145 is provided with a slot 147 which communicates with the associated threaded opening 146 therein. One end of each shaft is threaded at 143b and threadedly engages the threaded opening 146 of one arm. A threaded aperture through the slotted end portion of each arm 145 accommodates a bolt 148 therein to permit the threaded opening 146 at that particular end of each arm to be adjusted. It will be noted that when the arms 145 engage the ends of the shafts 143, each arm will overlie and engage the associated circular knob 136 to prevent accidental displacement of the latter. By threadedly adjusting the arms 145 relative to the shafts 143, the side walls 115 can be clamped against the blades 141.

Referring again to FIG. 5, it will be noted that each of the projections 116 of the side walls have a downwardly facing concave recess 116a therein, each recess receiving and engaging the convex upper surface 150 of an elongated pressure bar 149. Each of the elongated pressure bars 149 has a flat lower surface which engages a yieldable plastic tube 151 which engages the end portion of adjacent stripper fingers 144. Thus, it will be seen that the stripper fingers 144 are urged into engaging relation with the connecting portions 125a of the revolvable gripping members.

The handle 112 has a rotary hydraulic motor 152 mounted therein having an output shaft 153 projecting forwardly therefrom to which is secured a worm 154. The worm 154 is disposed in meshing relation with the worm gear 128 whereby when the rotary hydraulic motor 152 is energized, the worm 154 will be driven to thereby drive the roll assembly 118.

The rotary hydraulic motor 152 is a reversible type and is connected by a pair of conduits 155 to a source of hydraulic fluid under pressure. A control button 156 is mounted on the handle 112 and is connected to a valve 157 for operating the reversible hydraulic motor 152.

In operation, when hydraulic fluid under pressure is supplied to the rotary hydraulic motor 152, the motor will be driven in one direction when the control button 156 is depressed. However, when the control button 156 is released, the hydraulic motor will be driven in the opposite direction. Thus, the roll assembly 118 will be reversibly driven which facilitates skinning of the animal carcass. In this respect the suspended carcass will be engaged by the knife at the lower end of the carcass when the hand skinning knife is driven in one direction to permit removal of a strip of skin as the knife is moved in an upward direction by an operator. Thereafter, by reversing operation of the reversible hydraulic motor, an operator may then remove a strip of skin from the carcass by moving the skinning knife in a downward direction.

From the foregoing description, it will be seen that I have provided a novel hand skinning device which is not only of simple and inexpensive construction and operation, but one which functions in a more efficient manner than any heretofore known comparable skinning device.

I claim:

1. A hand held power skinning knife for skinning animals such as hogs and the like, comprising:
   a housing,
   a handle mounted on said housing and projecting therefrom,
   an elongate blade mounted on said housing and extending transeversely thereof and having a cutting edge,
   an elongate, revolvable roll assembly mounted on said housing and extending transversely thereof, said roll assembly including a plurality of toothed wheels having teeth projecting outwardly therefrom in close proximity to the cutting edge of said blade and cooperating with the latter to grip a portion of an animal skin therebetween,
   a second elongate blade mounted on said housing and extending transversely thereof and having a cutting edge positioned in close proximity to the teeth of said assembly, said blades having their cutting edges disposed in opposed relation with respect to each other,
   a driven element connected with said toothed wheels,
   a revolvable drive element mounted on said handle and engaging said driven element, and reversible power means engaging said drive element for revolving the roll assembly in opposite directions whereby a a portion of animal skin gripped between the roll assembly and one of said blades will be progressively pulled against the cutting edge of one of said blades to cut a strip of skin from the animal carcass.

2. The power skinning knife as defined in claim 1 wherein said driven element comprises a worm gear and wherein said drive element comprises a worm.

3. The power skinning knife as defined in claim 1 and means for yieldably urging said blades in a direction towards the teeth of the toothed wheels of the roll assembly.

4. The power skinning knife as defined in claim 1 wherein the toothed wheels of said roll assembly are axially spaced apart with respect to each other, and a plurality of finger elements each projecting into an axial space between adjacent toothed wheels.

5. A hand held power skinning knife for skinning animals such as hogs and the like, comprising:

a housing including opposed side walls, an elongate handle mounted on said housing and projecting longitudinally therefrom, the general longitudinal axis of the handle being spaced between said side walls, an elongate blade pivotally mounted on said housing and extending transversely thereof and having a cutting edge, an elongate, revolvable roll assembly extending between and being mounted on said side walls of said housing, said roll assembly including a plurality of toothed wheels having teeth projecting outwardly therefrom in close proximity to the cutting edge of said blade and cooperating with the latter to grip a portion of an animal skin therebetween, a driven element connected with said toothed wheels and located intermediate the ends of said roll assembly, a revolvable drive element mounted on said handle and engaging said driven element, the rotational axis of said drive element being disposed in substantially co-axial relation with the general longitudinal axis of the handle, and power means engaging said drive element for revolving the roll assembly in a direction whereby a portion of animal skin gripped between the roll assembly and blade will be progressively pulled against the cutting edge of the blade to cut a strip of skin from from the animal carcass.

6. The power skinning knife as defined in claim 5 and means for yieldably urging said blade towards said roll assembly.

7. The power skinning knife as defined in claim 5 wherein the side walls of said housing have projections extending forwardly therefrom, said roll assembly extending between and being revolvably mounted on said side wall projections, the general longitudinal axis of said handle extending between said side wall projections.

* * * * *